Sept. 18, 1928.  1,684,636
J. H. MENDENHALL
ANTIRATTLING DEVICE FOR WINDOWS
Filed Jan. 8, 1926
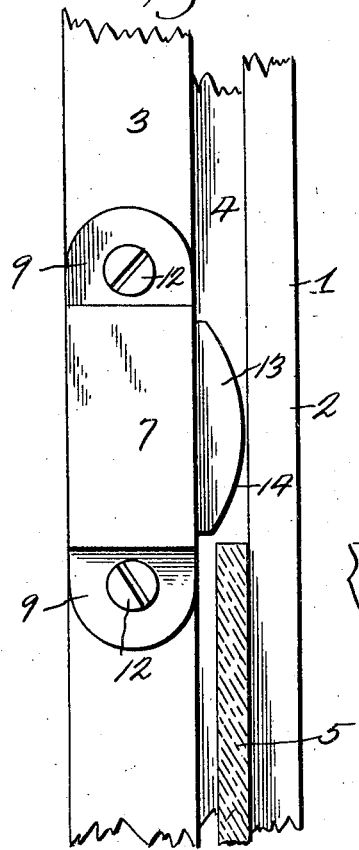
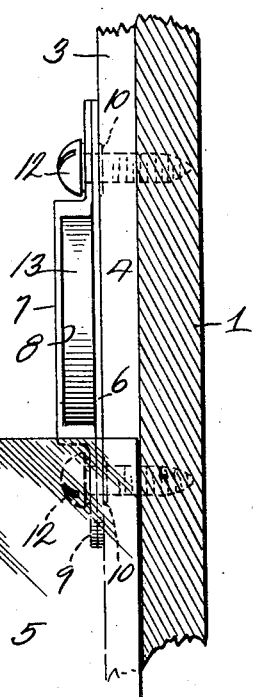
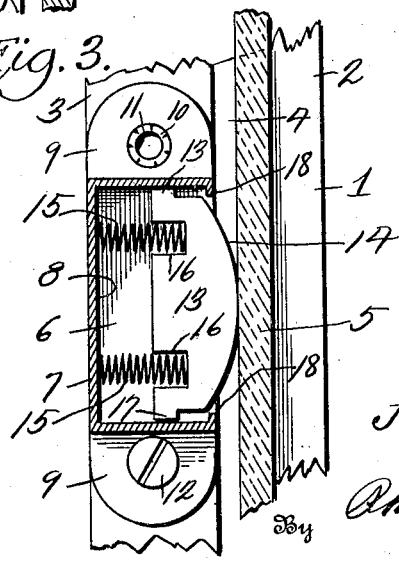
Inventor
J. H. Mendenhall
By Philip A. H. Ferrell
Attorney Patented Sept. 18, 1928.

1,684,636

UNITED STATES PATENT OFFICE.

JAMES H. MENDENHALL, OF NOTTINGHAM, PENNSYLVANIA.

ANTIRATTLING DEVICE FOR WINDOWS.

Application filed January 8, 1926. Serial No. 79,962.

The invention relates to antirattling devices for windows, particularly car windows or automobile windows, and has for its object to provide a device of this character comprising a casing adapted to be secured to one of the strips of the window frame, and provided with a convex member, preferably provided from fibrous material, and which member is normally forced towards one side of the window pane by means of spaced coiled springs, whereby when the window is raised the follower will be held in close engagement therewith by the coiled spring for preventing the window from rattling.

A further object is to provide the open end of the casing with inturned lugs or flanges in the path of lugs carried by the upper and lower ends of the convexed member, and which limit the outward movement of the convexed member.

A further object is to form the casing from a flat plate which forms a closure for one side of the casing and to secure the casing section ends together by hollow rivets through which securing screws may be passed for securing the casing in position.

With the above and other objects in view the invention resides in the combination and arrangement of parts as hereinafter set forth, shown in the drawing, described and claimed, it being understood that changes in the precise embodiment of the invention may be made within the scope of what is claimed without departing from the spirit of the invention.

In the drawing:

Figure 1 is a side elevation of the antirattling device, showing the same applied to a window frame.

Figure 2 is a front elevation of the antirattling device and a portion of a window, showing a portion of the window frame in section.

Figure 3 is a view similar to Figure 1, but showing a portion of the device broken away to better show the structure.

Referring to the drawing, the numeral 1 designates one side of a window frame which is provided with vertically disposed spaced strips 2 and 3, which form a vertically disposed channel 4, in which is slidably mounted a window glass 5, for instance of the type used in automobile bodies or car windows, and which window glass if no means is provided, creates an objectionable noise incident to rattle when the vehicle goes over rough ground. The antirattling device comprises a flat plate 6, to which is secured a removable section 7. The removable section 7 is provided with a chamber 8, and with ears 9, which engage the ends of the plate 6, and are secured thereto by means of hollow rivets 10. The hollow rivets 10, not only secure the section 7 and the plate 6 together, but also are adapted to receive in the apertures 11 thereof securing screws 12, whereby the casing may be easily and quickly applied to the strip 3. Slidably mounted within the chamber 8 of the removable section 7 is a glass engaging member 13, the outer side of which is provided with a convexed surface 14, against which the inner side of the glass 5 engages when said glass is forced upwardly, consequently the expansive action of the spaced coiled springs 15, which are disposed in recesses 16 in the inner side of the member 13 will maintain the member 13 in close yieldable engagement with the glass 5 and prevent said glass from rattling, and at the same time the convexed surface 14 will allow the glass 5 to be easily moved upwardly or downwardly when it is desired to close or open the window. The upper and lower ends of the member 13 are provided with upwardly and downwardly extending lugs 17, which lugs are in the path of inwardly extending flanges 18 carried by the end walls of the removable section 13, therefore it will be seen that said lugs and flanges will limit the outward movement of the glass engaging member 13. The glass engaging member 13 may be formed of any material, however it is preferably formed from what is known as fibre material which is relatively hard, but at the same time will yield slightly, and will not mar the glass. It will also allow the glass to easily slide and will not bind, but at the same time the coiled springs 15 will supply the necessary power to cause the member 13 to hold the glass 5 against rattling.

From the above it will be seen that an antirattling device is provided which is particularly adapted for use in connection with car windows, however it is applicable for general use in connection with windows of various kinds. It will also be seen that the holding member 13 will not mar the window glass as it is made of a material which will not scratch the glass and at the same time one which easily polishes and allows the glass window to easily slide during its upward and downward movement.

The invention having been set forth what is claimed as new and useful is:—

An antirattling device for windows comprising a casing adapted to be secured to a window frame adjacent a slidably mounted window glass, said casing comprising a flat plate, a removable chambered section secured to one side of said plate, hollow rivets attaching the chambered section to the plate, a window engaging member slidably mounted in the chamber of the chambered section, spaced coiled springs engaging the bottom of the chamber of the chambered section, the ends of said springs being disposed in recesses in the inner side of the window engaging member, the opposite side of the window engaging member being convexed, flanges extending towards each other and carried by the chambered section at opposite ends of the chamber therein and lugs carried by the ends of the window engaging member in the path of said flanges.

In testimony whereof I hereunto affix my signature.

JAMES H. MENDENHALL.